US012614880B2

(12) United States Patent
Cheng

(10) Patent No.: US 12,614,880 B2
(45) Date of Patent: Apr. 28, 2026

(54) CONNECTOR COMPONENT, TRANSMISSION LINE SYSTEM AND ADJUSTMENT METHOD AND INSTRUCTION SET THEREOF

(71) Applicant: ELKA INTERNATIONAL LTD., New Taipei City (TW)

(72) Inventor: Yi-Chieh Cheng, New Taipei City (TW)

(73) Assignee: ELKA INTERNATIONAL LTD., New Taipei City (TW)

( * ) Notice: Subject to any disclaimer, the term of this patent is extended or adjusted under 35 U.S.C. 154(b) by 362 days.

(21) Appl. No.: 18/419,956

(22) Filed: Jan. 23, 2024

(65) Prior Publication Data

US 2025/0062577 A1 Feb. 20, 2025

(30) Foreign Application Priority Data

Aug. 18, 2023 (TW) ................................ 112131168

(51) Int. Cl.

*H01R 12/51* (2011.01)
*H01R 13/405* (2006.01)
*H01R 13/514* (2006.01)
*H01R 13/66* (2006.01)
*H01R 24/60* (2011.01)

(52) U.S. Cl.

CPC ......... *H01R 13/6608* (2013.01); *H01R 12/51* (2013.01); *H01R 13/405* (2013.01); *H01R 13/514* (2013.01); *H01R 24/60* (2013.01)

(58) Field of Classification Search

CPC ......................... H01R 13/6608; H01R 13/405; H01R 13/514; H01R 12/51; H01R 24/60

USPC .......................................................... 375/236

See application file for complete search history.

(56) References Cited

U.S. PATENT DOCUMENTS

| | | | |
|---|---|---|---|
| 11,822,497 | B2 | 11/2023 | Lin |
| 2018/0136943 | A1 | 5/2018 | Chew et al. |
| 2018/0287771 | A1 | 10/2018 | Srivastava et al. |

FOREIGN PATENT DOCUMENTS

| | | | | |
|---|---|---|---|---|
| CN | 116339660 | A | 6/2023 | |
| CN | 119088610 | A * | 12/2024 | .......... G06F 11/0751 |

(Continued)

OTHER PUBLICATIONS

Extended European Search Report for European Application No. 24194209.3, dated Dec. 17, 2024.

(Continued)

*Primary Examiner* — Dominic D Saltarelli
(74) *Attorney, Agent, or Firm* — Birch, Stewart, Kolasch & Birch, LLP

(57) ABSTRACT

A video transmission connector component comprises a video transmission connector and a circuit substrate. The circuit substrate at least includes a regulation module; wherein the circuit substrate is coupled with a pin group of the video transmission connector through a first pad set arranged on the circuit substrate; wherein the regulation module includes a control unit and a redriver. The redriver is configured to couple to at least one signal transmission pin of the pin group of the video transmission connector. Wherein the control unit is coupled to the redriver and the redriver receives at least one relay parameter which is used to adjust signals transmitting to the at least one signal transmission pin.

23 Claims, 8 Drawing Sheets

(56) References Cited

FOREIGN PATENT DOCUMENTS

| | | | | |
|---|---|---|---|---|
| CN | 119495960 A | * | 2/2025 | ............. H04N 5/268 |
| TW | 202217588 A | | 5/2022 | |

OTHER PUBLICATIONS

Setterberg, "DisplayPort Link Training Optimization," Master's Thesis in Embedded Electronic System Design, Department of the Computer Science and Engineering, Jun. 1, 2017, XP055960058, pp. 1-73.

Texas Instruments: "TDP158 6-Gbps, AC-Coupled to TMDS(TM) or Hdmi (TM) Level Shifter Redriver", Jun. 1, 2017, XP055570838, pp. 1-58.

* cited by examiner

CONNECTOR COMPONENT, TRANSMISSION LINE SYSTEM AND ADJUSTMENT METHOD AND INSTRUCTION SET THEREOF

FIELD OF THE INVENTION

The disclosure relates to a connector component, transmission line system, and adjustment method and instruction set; in particular, a connector component and a transmission line system having a control unit and redriver, and adjustment method and instruction set thereof.

BACKGROUND OF THE INVENTION

For long-distance transmission applications, active transmission lines with redriver are commonly used. However, the relay parameters in a redriver will be adjusted based on the application of the active transmission lines. For example, when the signal attenuation between two ends of an active transmission line exceeds the standard specifications, it is necessary to adjust the relay parameters in the redriver to ensure that the signal between the two ends of the active transmission line fulfills the standard specifications. However, if the relay parameters of the redriver are not set properly, it may cause the signal transmitting in the active transmission line to be over amplified. Accordingly, the signal transmitting in the active transmission line may be cut off or the eye diagram test of the active transmission line may fail.

The relay parameters of the redriver in the connector component of the active transmission line will be adjusted according to several factors such as the length, diameter, or material of the active transmission line. However, the relay parameters of the redriver in a conventional video transmission connector component only can be adjusted by modifying the layout of passive components or conductor lines on the circuit substrate of the conventional video transmission connector component. Once the number of relay parameters increases, the burden of managing components mounted on the circuit substrates and/or the type of the circuit substrates will get heavier accordingly. Thus, the costs for purchasing, managing, and/or storing components for the manufacturer will increase accordingly.

Therefore, how to set relay parameters for the redriver in a connector component in a simplified and converged way will be a major issue of research and development in this field.

SUMMARY OF THE INVENTION

One of the purposes of the disclosure is to simplify the hardware requirements for setting the relay parameters for the redriver in the video transmission connector component.

One of the purposes of the disclosure is to adjust the transmission line systems according to various lengths of transmission without changing the hardware architecture.

The disclosure provides a video transmission connector component. The video transmission connector component comprises a video transmission connector and a circuit substrate. The circuit substrate at least includes a regulation module; wherein the circuit substrate is coupled with a pin group of the video transmission connector through a first pad set arranged on the circuit substrate; wherein the regulation module includes a control unit and a redriver. The redriver is configured to couple to at least one signal transmission pin of the pin group of the video transmission connector. Wherein the control unit is coupled to the redriver and the redriver receives at least one relay parameter which is used to adjust signals transmitting to the at least one signal transmission pin.

The disclosure provides a transmission line system. The transmission line system comprises a transmission cable and the video transmission connector component mentioned above which is arranged at least one side of the transmission cable.

The disclosure provides a regulation method for a video transmission connector component. The regulation method comprises: arranging a regulation module on a circuit substrate of the video transmission connector component, wherein the regulation module includes a control unit and a redriver; establishing a communication link between the control unit and the redriver; providing, by the control unit via the communication link, at least one relay parameter to the redriver; and adjusting, by the redriver, signal transmitting to the at least one signal transmission pin according to the at least one relay parameter.

The disclosure provides an instruction set stored in a control unit of a video transmission connector component. The instruction set executable by the control unit to: establish a communication link with a redriver of the video transmission connector component; and provide, through the communication link, at least one relay parameter to the redriver.

In summary, the control unit of the discourse is configured to establish the communication link with the redriver to control and set the relay parameters to the redriver. Therefore, the relay parameters of the redriver are set by the control unit with various relay parameters without modifying the hardware architecture of the video transmission connector component (such as circuit layout and/or component arrangement on the circuit substrate). For example, the relay parameters of the redriver can be set by coding instruction sets for different parameters into the control unit. When the video transmission connector component is integrated with transmission cables to form transmission line systems with different lengths, the control unit can be written different instruction sets corresponding to different relay parameters to make the redriver provide different signal regulation effects to transmission line systems with different lengths. Therefore, the transmission line systems will meet the requirements of transmission quality and standards with the same hardware architecture.

BRIEF DESCRIPTION OF THE DRAWINGS

The accompanying drawings are presented to aid in the description of various aspects of the disclosure and are provided solely for illustration of the aspects. To simplify the drawings and highlight the contents to be presented in the drawings, the well-known structures or elements in the drawings may be drawn in a simple schematic manner or presented in an omitted manner. For example, the number of elements may be singular or plural. These drawings are provided only to explain these aspects and not to limit thereof.

DETAILED DESCRIPTION OF THE PREFERRED EMBODIMENTS

Even though the terms such as "first", "second", and "third" may be used to describe an element, a part, a region, a layer, and/or a portion in the present specification, these elements, parts, regions, layers and/or portions are not limited by such terms. Such terms are used to differentiate an element, a part, a region, a layer, and/or a portion from another element, part, region, layer, and/or portion. Therefore, in the following discussions, a first element, portion, region, or portion may be called a second element, portion, region, layer, or portion, and do not depart from the teaching of the present disclosure. The terms "comprise," "include", or "have" used in the present specification are open-ended terms and mean to "include", but not limited to As used herein, the term "coupled to" in the various tenses of the verb "couple" may mean that element A is directly connected to element B or that other elements may be connected between elements A and B (i.e., that element A is indirectly connected with element B).

The terms "approximate" or "essentially" used in the present specification include the value itself and the average values within the acceptable range of deviation of the specific values confirmed by a person having ordinary skill in the current art, considering the specific measurement discussed and the number of errors related to such measurement (that is, the limitation of the measurement system). For example, "about" may mean within one or more standard deviations of the value itself or ±30%, ±20%, ±10%, +5%. In addition, "about", "approximate", or "essentially" used in the present specification may select a more acceptable range of deviation or standard deviation based on optical property, etching property, or other properties. One cannot apply one standard deviation to all properties.

First Embodiment

Figure 1:
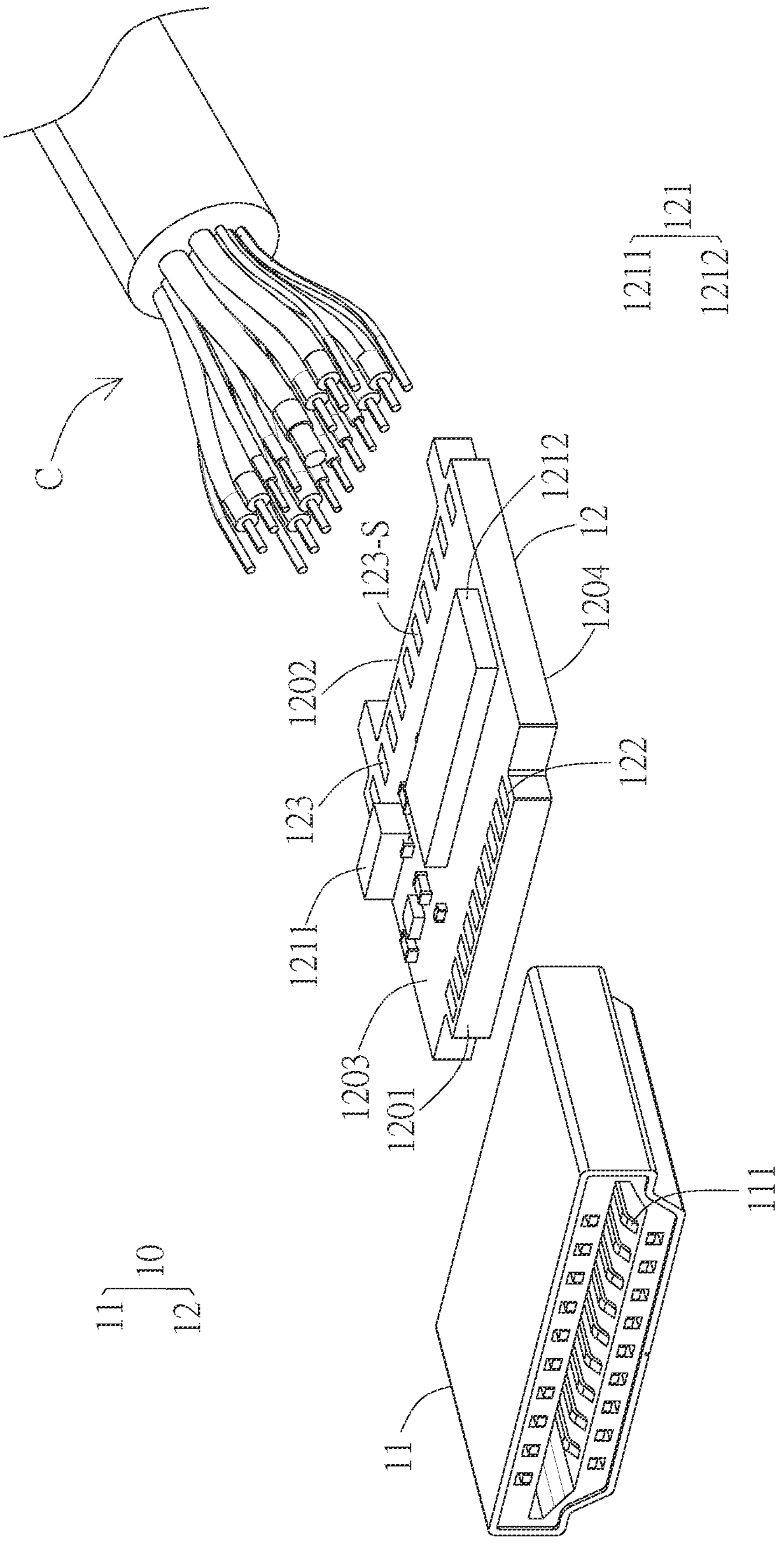
FIG. 1 and FIG. 2 are structure schematic diagrams of the video transmission connector component according to the first embodiment of the disclosure.
Figure 2:
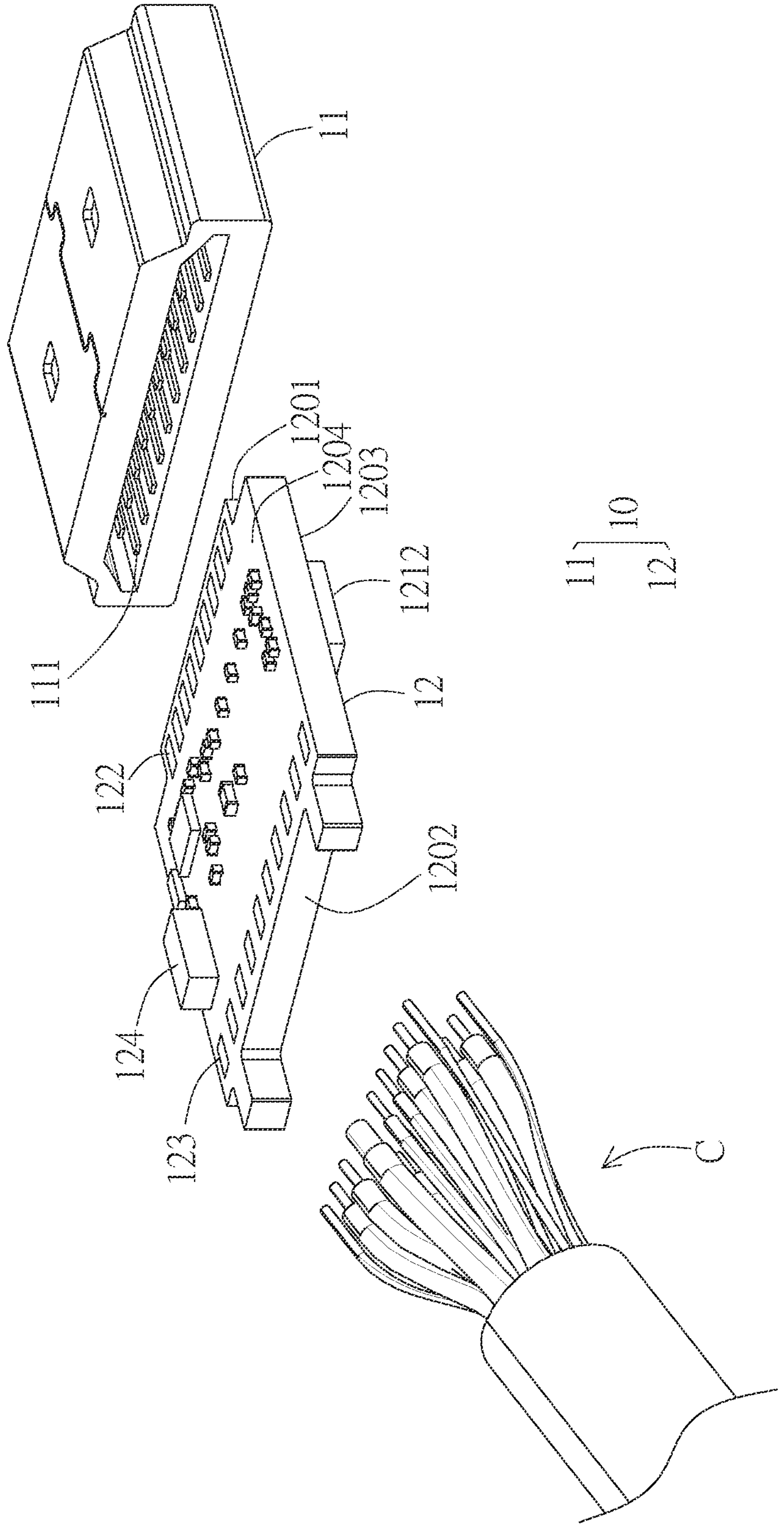
Figure 3:
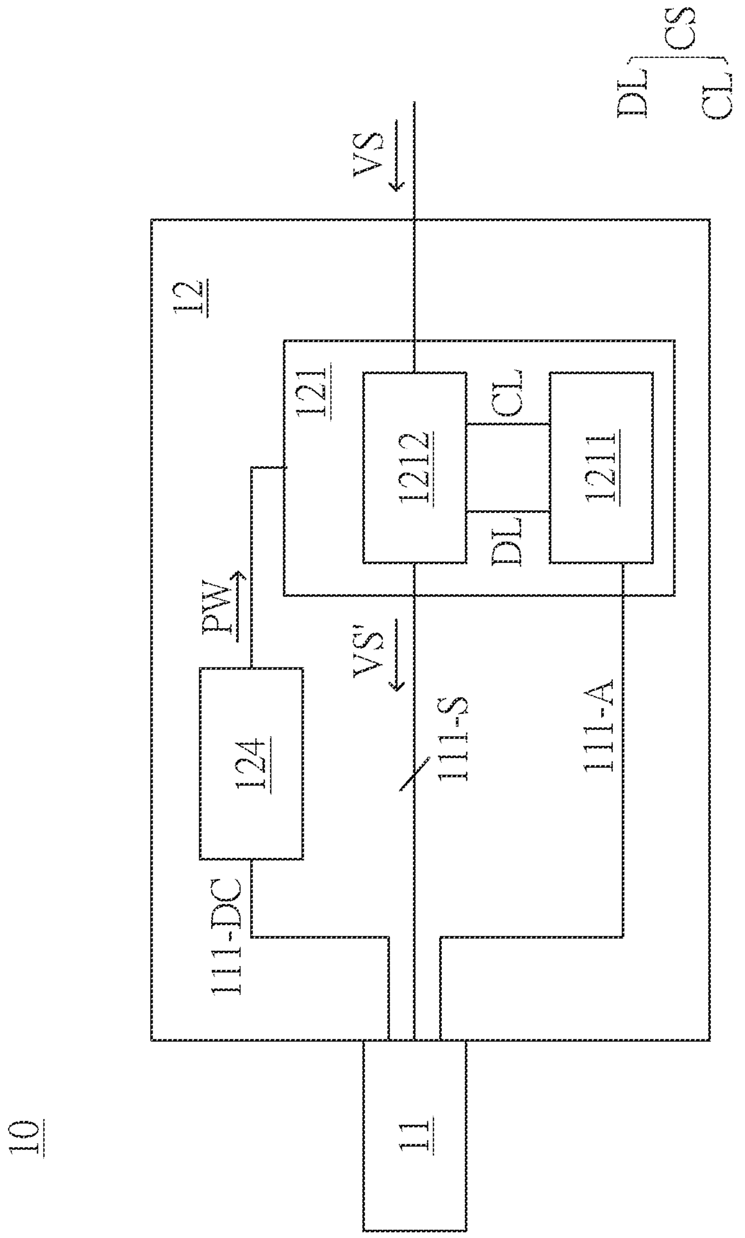
FIG. 3 is a block diagram of the video transmission connector component according to the first embodiment of the disclosure.

Refer to FIG. 1 to FIG. 3, FIG. 1 to FIG. 3 illustrates the video transmission connector component 10. The video transmission connector component 10 comprises the video transmission connector 11 and the circuit substrate 12 at least includes the regulation module 121. The circuit substrate 12 is coupled to the pin group 111 of the video transmission connector 11 via the first pad set 122. Wherein the regulation module 121 includes the control unit 1211 and the redriver 1212 configured to couple with the at least one signal transmission pin 111-S in the pin group 111 of the video transmission connector 11. Wherein the control unit 1211 is coupled to the redriver 1212 (for example, via the communication pair CS). The redriver 1212 is configured to receive at least one relay parameter from the control unit via the communication pair CS to regulate the signal VS transmitted to/from at least one signal transmission pin 111-S.

More specifically, the specification of the video transmission connector 11 may be selected from High-Definition Multimedia Interface (HDMI), DisplayPort (DP), or any video transmission connectors. In an embodiment, the video transmission connector 11 has a setting structure that limits the setting direction of the video transmission connector 11. The video transmission connector 11 may be a plug or a socket. It should be understood that the plug and socket of the presented invention can be equivalently exchanged and/or substituted with each other without affecting the implementation of the presented invention. The pin group 111 of the video transmission connector 11 may contain pins corresponding to different usages/functions. Taking HDMI connectors as an example, the pin groups of HDMI connectors may have DC signal pins, high-frequency signal pins, and/or low-frequency signal pins. More specifically, the DC signal pins may be denoted as the power supply pin that transmits DC power and the grounding pin that serves as the grounding terminal; the high-frequency signal pins may be denoted as differential signal transmission pins. In an HDMI connector, there may be three to four sets of differential signal transmission pin pairs for transmitting video or other high-frequency signals. The low-frequency signal pins may be denoted as the Consumer Electronics Control (CEC) pins or HEAC pins configured to transmit low-frequency signals or to apply applications based on low-frequency signals.

The materials of the circuit substrate 12, such as fiberglass, materials for making electric board, or other conventional substrate materials. The circuit substrate 12 is configured to be a carrier/platform to arrange electronic components, chips, active/passive components, pins, pads, or conducting wires. The circuit substrate 12 may be configured to a single-layer, double-layer, or multi-layer substrate according to the complexity of the circuit and the structural/space limitations of the circuit. The first side 1201 of the circuit substrate 12 is connected to the video transmission connector 11. The surface of the circuit substrate 12 (such as the first surface 1203 or the second surface 1204) has the first pad set 122 near the first side 1201. The first pad set 122 is configured to be coupled to the pin group 111 of the video transmission connector 11. The coupling methods to couple the first pad set 122 with the pin group 111 may employ contacting, welding, crimping, or any conventional means for coupling. The second side 1202 of the circuit substrate 12 is configured to couple with the transmission cable C. The surface of the circuit substrate 12 (for example, the first surface 1203 or the second surface 1204) has the second pad set 123 near the second side 1202. The second pad set 123 is configured to couple with the core wire(s) of transmission cable C through welding or any conventional means for coupling. The second pad set 123 has at least one signal pad 123-S that can be coupled to the core wire(s) configured to transmit high-frequency signals or video signals (the signal VS) in the transmission cable C. In a HDMI cable, the core wire(s) configured to transmit high-frequency signals or video signals are the differential signal transmission lines. On the other hand, circuit protection components such as diodes or TVS components can also be installed on the circuit substrate 12 to protect regulation module 121 or other chips on the circuit substrate 12.

The regulation module 121 arranged on the circuit substrate 12 may be accomplished employing single-chip or multi-chips. For example, regarding the means of a single chip, the regulation module 121 is formed by a single chip that can function as the redriver 1212 and the control unit 1211. On the other hand, regarding to means of multi-chips, the regulation module 121 may be formed by integrating at least two chips. More specifically, regulation module 121 includes a chip or chipset used for the control unit 1211 and a chip or chipset used for redriver 1212. In other words, the presented invention does not limit the composition and types of the regulation module 121. Any means that can achieve/apply the regulation module 121 of the presented invention should belong to the scope of the presented invention. The redriver 1212 and control unit 1211 can be set on the first surface 1203 or the second surface 1204 of the circuit substrate 12, and preferably located between the first pad set 122 and the second pad set 123 to facilitate the path planning of conductor lines. It should be noted that FIG. 1 and FIG. 2 are only illustrative examples of the component configuration on the circuit substrate 12 and are not intended to limit the presented invention. The presented invention does not limit the layout of the circuit configuration on the circuit substrate 12. The components on the circuit substrate 12 can be set on the first surface 1203 or the second surface 1204 of the circuit substrate 12 according to the conventional arrangement for circuit layout.

In an embodiment, the circuit substrate 12 further comprises the power module 124. The power module 124 is connected to the DC pins 111-DC (such as the ground pin and/or the power pin) in the pin group 111 of the video transmission connector 11 through a conducting wire. The power module 124 converts the power transmitted by the video transmission connector 11 into the required power PW for the redriver 1212 and/or the control unit 1211. Accordingly, when the power provided by the DC pins 111-DC of video transmission connector 11 is not applicable to the specifications of the required power for the redriver 1212 and/or the control unit 1211 (such as voltage or power), the power management module 124 can sever as a power regulator to provide the required power PW for the redriver 1212 and/or the control unit 1211. However, in case of that the power provided by the DC pins 111-DC applies to the specification of the required power PW for the redriver 1212 and/or the control unit 1211, the DC pins 111-DC may directly provide the required power PW to the redriver 1212 and/or the control unit 1211. The required power PW also can be provided by the power wire and the grounding wire in the transmission cable C. In other words, the power supply means for the redriver 1212 and/or the control unit 1211 disclosed by the presented invention is not limited to the power management module 124.

The control unit 1211 is composed of circuits including programable components such as microprocessors, Field Programmable Gate Array (FPGA), Application Specific Integrated Circuit (ASIC), system on chips (SoC), or multi-chip systems and integrated on the circuit substrate 12 of the video transmission connector component 10. In the embodiment, the control unit 1211 is configured to regulate the relay parameters of the redriver 1212. Preferably, the control unit 1211 may include memory which can store instruction set(s), the control unit 1211 may operate according to the instruction sets. It should be noted that the presented invention does not limit the writing means of the instruction sets for control unit 1211.

In an embodiment, the control unit 1211 can be written instruction set before arranging the control unit 1211 on the circuit substrate 12.

In an embodiment, the writing pin of the control unit 1211 may be configured to couple to the non-specified pin 111-A in pin group 111 of the video transmission connector 11. Accordingly, writing an instruction set into the control unit 1211 may be implemented through the non-specified pin 111-A of the video transmission connector 11. Although FIG. 3 illustrates that the pins in the pin group 111 can be classified as the DC pin 111-DC, the signal transmission pin 111-S, and the non-specified pin 111-A, it should be noted that the non-specified pin 111-A can be any pin in the pin group 111. In other words, the DC pin 111-DC and the signal transmission pin 111-S can also be configured to be coupled to the writing pin of the control unit 1211 and used for writing instructions set into the control unit 1211.

In the embodiment, the control unit 1211 can be written instructions set by a programmer connected to the video transmission connector 11 through the pins of the video transmission connector 11. For example, the programmer can have a socket corresponding to the structure of the video transmission connector 11. When the video transmission connector 11 is set into the socket of the programmer, the programmer writes the instruction set into the control unit 1211 through the non-specified pin 111-A in the pin group 111 of the video transmission connector 11. It should be noted that the control unit 1211 is detachable to couple with the non-specified pin 111-A, and the example definition of the term "detachable to couple" is that the connection status, between the control unit 1211 and the non-specified pin 111-A of the video transmission connector 11, before/after the control unit 1211 writing the instruction is selectable and modifiable. For example, the control unit 1211 can be coupled to the non-specified pin 111-A of the video transmission connector 11 through conducting wire(s) and/or passive component(s) (such as a zero-ohm resistor) on the circuit substrate 12 when writing the instruction set. After the writing process is completed, the passive component mounted on the circuit substrate 12 can be removed or the conducting wire preserved on the circuit substrate 12 can be truncated. On the other hand, "detachable to couple" also can be achieved using switching the writing input of the control unit 1211 by components arranged between the non-specified pins 111-A and the control unit 1211. The components for switching the writing input of the control unit 1211 may be switches, multiplexers, selectors, or on/off circuits. Except for the aforementioned switching or disconnecting means, any conventional means to achieve means of "detachable to couple" defined by the disclosure should belong to the scope of the presented invention. In this way, it is possible to avoid the influence of the control unit 1211 during the signal transmission process of the video transmission connector component 10 or to free the non-specified pins 111-A occupied by the control unit 1211 to avoid influencing the transmission quality.

On the other hand, the control unit 1211 can be written through a low-frequency pin in pin group 111 of the video transmission connector 11 which is less influencing the signal transmission process. More specification, in a HDMI connector, the CEC pin is usually configured as idle and does not configure to transmit high-frequency signal, the CEC pin can be used for writing the instruction set into the control unit 1211. After the control unit 1211 completes the instruction set writing, it is non-mandatory to disconnect the connection between the control unit 1211 and the low-frequency pin (CEC pin) due to the connection between the control unit 1211 and the low-frequency pin is less influencing the signal transmission process. In other words, by means of using a low-frequency pin to write the control unit 1211 can avoid affecting the transmission of high-frequency signal or other prime signal transmission of the video transmission connector 11. The means of using a low-frequency pin to write the control unit 1211 can also reduce the additional labor/effort to hardware modification after finishing the writing process. On the other hand, the reserved connection between the control unit 1211 and the low-frequency pin configured to write instructions on the circuit substrate 12 can be used for re-writing instruction sets to the control unit 1211 in the feature. The reserved connection is beneficial for parameter testing or maintenance and replacement of the video transmission connector component 10.

In the embodiment, the programmer may be a computing device such as a desktop computer, a laptop computer, an industrial computer, and/or a tablet computer. The programmer may also be a board-mounted device connected to a computer. Compared to writing the instruction set into the control unit 1211 prior to setting the control unit 1211 on the circuit substrate 12 of the video transmission connector component 10, directly writing the instruction set into the control unit 1211 through the video transmission connector 11 will provide flexibility in setting the control unit 1211. For example, when the control unit 1211 needs to expand, adjust, remove, or replace firmware or instruction sets, it is only necessary to connect the video transmission connector 11 through the programmer and directly installs or writes the updated instruction set into the control unit 1211, without removing and replacing components of the control unit 1211. Directly writing the instruction set into the control unit 1211 through the video transmission connector 11 will avoid rework or simplify the testing/manufacturing processes to reduce the effort or cost of managing materials and/or reduce the manufacturing time.

The redriver 1212, for example, may be configured to relay, modify, and/or regulate the high-frequency signal VS transmitted (such as received or sent) to/from at least one signal transmission pin 111-S of the video transmission connector component 10 to the redrived signal VS'. The relay processing performed by the redriver 1212 may be operations to enhance, modulate or re-product signal, such as signal equalization, pre-emphasis signal, and/or de-emphasis signal. The control unit 1211 is configured to establish the communication link with redriver 1212. More specifically, the control unit 1211 may use a physical connection to couple with the redriver 1212. For example, the communication pair CS on the circuit substrate 12. The physical conducting lines(s) between the control unit 1211 and the redriver 1212 may be, for example, the data line DL and the clock line CL. The communication link, initiated by the control unit 1211 and connected with the redriver 1212, may follow communication protocols such as Inter Integrated Circuit (I2C). It should be noted that the communication link can also be established by non-physical line(s). For example, when the control unit 1211 is configured to perform a wireless connection with the redriver 1212. The control unit 1211 and the redriver 1212 may communicate via wireless communication such as infrared, Bluetooth, RFID, or ZigBee. However, the presented invention does not limit the types or protocols of the communication link between the control unit 1211 and the redriver 1212. The types or protocols of the communication links can be selected according to the specifications provided by the control unit 1211 and the redriver 1212 or the application requirement and/or cost of the video transmission connector component 10.

By the communication link between the control unit 1211 and the redriver 1212 via the communication pair CS, the control unit 1211 can provide commands to the redriver 1212 to adjust the relay parameters for the signal transmission pin 111-S. It should be noted that the redriver 1212 may have a plurality of relay parameters corresponding to several signal transmission pins 111-S. Taking HDMI as an example, HDMI has four differential signal transmission pairs. Wherein the four differential signal transmission pairs may have the same relay parameters or each of the four differential signal transmission pairs may have their relay parameter which is equal or not equal to each other. The relay parameters can be adjusted according to the material, length, and/or diameter of the transmission cable C connected to the video transmission connector component 10. The purpose of adjusting the relay parameters is to ensure that the signal transmitting through a transmission line system formed by the video transmission connector component 10 and the transmission cable C comply with standard specifications and is quantified to the eye diagram test. More specifically, transmission line systems with different specifications may need different relay parameters. For example, a longer transmission cable may require a higher gain to avoid excessive signal loss in the transmission line system. However, if a short transmission cable is set a gain the same as a long cable, it may cause the signal to be excessively amplified and be cut off or unable to meet the standard eye diagram test.

It should be noted that the means of adjusting the relay parameters of the redriver 1212 in the presented invention is not limited to the above examples. The relay parameters of the redriver 1212 can be controlled/adjusted according to the specifications and operation guidelines of the redriver 1212. For example, the relay parameters (such as signal gain) of the redriver 1212 can be adjusted by modifying the values of passive components (such as capacitors, inductors, or resistors) in redriver 1212. Alternatively, the relay parameters of the redriver 1212 can be adjusted by writing a value to register(s) of the redriver 1212. In this case, the redriver 1212 will read the value stored in the register(s) and turn the relay parameters according to the value of the register(s).

Through the video transmission connector component 10 mentioned above, the relay parameters of the redriver 1212 can be adjusted without changing the hardware architecture of the video transmission connector component 10. Various transmission line systems formed by the video transmission connector component 10 integrated with different lengths of transmission cables will meet corresponding standards.

Second Embodiment

Figure 4:
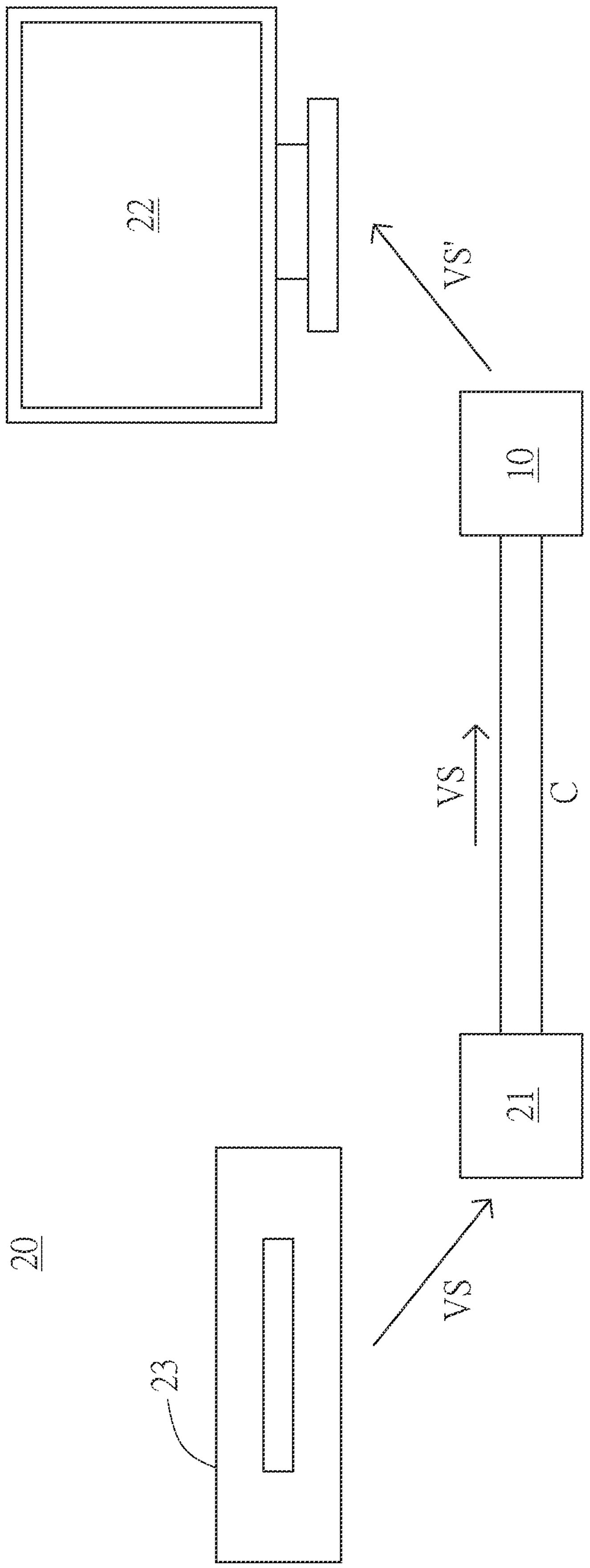
FIG. 4 *a* is a schematic diagram of the transmission line system according to the second embodiment of the disclosure.

The video transmission connector component 10 of the first embodiment can be formed as a transmission line system. Refer to FIG. 4, FIG. 4 illustrates that the video transmission connector component 10 can be integrated with the transmission cable C to form the transmission line system 20. More specifically, each pad of the second pad set 123 of the video transmission connector component 10 is configured to couple the corresponding core wires of the transmission cable C. The relay parameters of video transmission connector component 10 can be adjusted according to the material, length, and/or wire diameter of the transmission cable C. The purpose of adjusting the relay parameters is to ensure that the signals measured at both ends of the transmission line system 20 will comply with standard specifications and the eye diagram test after the video transmission connector component 10 and the transmission cable C is formed as the transmission line system 20. However, different specifications of transmission cable C have different requirements for the relay parameters of transmission line system 20. More specifically, the transmission line system 20 formed by transmission cables with different length need different relay parameters. For example, a longer transmission cable may require a higher gain to avoid excessive signal loss in the transmission line system. However, if a short transmission cable is set a gain the same as a long cable, it may cause the signal to be excessively amplified and be cut off or unable to meet the standard eye diagram test.

It should be noted that the video transmission connector component 10 can be set at one end of the transmission cable C. The other end of the transmission cable C may integrate with a universal connector component 21. For example, if the specification of the video transmission connector 11 is HDMI, the other end of the transmission cable C may be integrated with a conventional HDMI connector component. The end of the transmission line system 20 integrated with the video transmission connector component 10 is, preferably, configured to be connected to a signal receiving terminal. The signal receiving terminal may be the display device 22 (such as a screen or projector). More specifically, the end of the transmission line system 20 integrated with the universal connector component 21 may be connected to a signal providing terminal to receive the signal VS. The signal providing terminal may be the signal outputting device 23 such as a set-top box, television box, etc. The signal VS is transmitted through the transmission cable C to the end of the transmission line system 20 integrated with the video transmission connector component 10. The signal VS to be transmitted is subjected to corresponding relay processing through the video transmission connector component 10 and becomes the redrived signal VS'. The redrived signal VS' is provided to the display device 22. It should be noted that the above configuration is only an example, the video transmission connector component 10 can be integrated to both ends of the transmission line system 20.

The transmission line system 20 with the video transmission connector component 10 is suitable for transmission cables C with various materials or lengths (i.e., different electrical characteristics) without changing the hardware architecture of the video transmission connector component 10. It can simplify hardware design and reduce material reserve requirements, and/or save the cost of manufacturing, design, or research and development.

Third Embodiment

Figure 5:
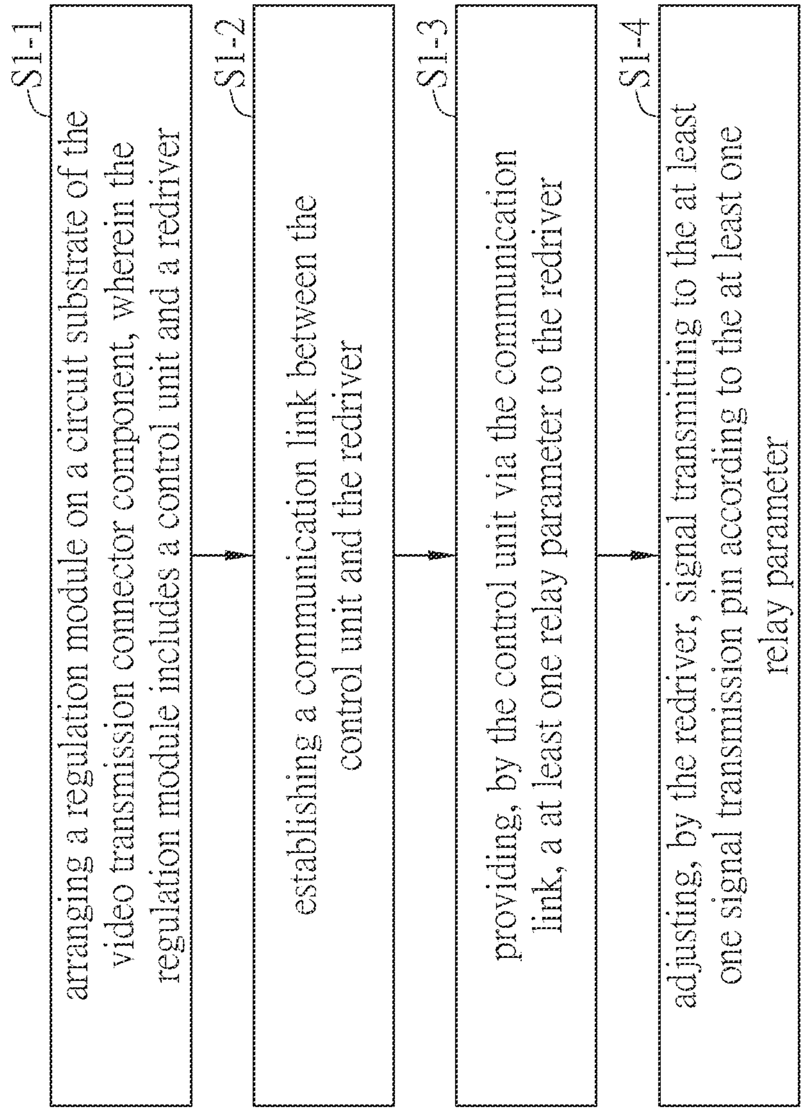
FIG. 5 to FIG. 7 are flow charts of the regulation method for video transmission connector components according to the third embodiment of the disclosure.

FIG. 5 illustrates a regulation method for a video transmission connector component. The regulation method comprises: arranging a regulation module on a circuit substrate of the video transmission connector component, wherein the regulation module includes a control unit and a redriver (step S1-1); establishing a communication link between the control unit and the redriver (step S1-2); providing, by the control unit via the communication link, a at least one relay parameter to the redriver (step S1-3); and adjusting, by the redriver, signal transmitting to the at least one signal transmission pin according to the at least one relay parameter (step S1-4).

More specifically, regarding step S1-1, contact pads for arranging components and conductor wires connecting the components or pins on the circuit substrate of the video transmission connector component can be made by any conventional circuit manufacturing procedures. The regulation module can be arranged on the circuit substrate of the video transmission connector component by surface mount, soldering, or any other conventional methods. The presented invention is not limited to circuit manufacturing methods. Any means of manufacturing a circuit that can achieve step S1-1 should belong to the scope of the presented invention.

Figure 6:
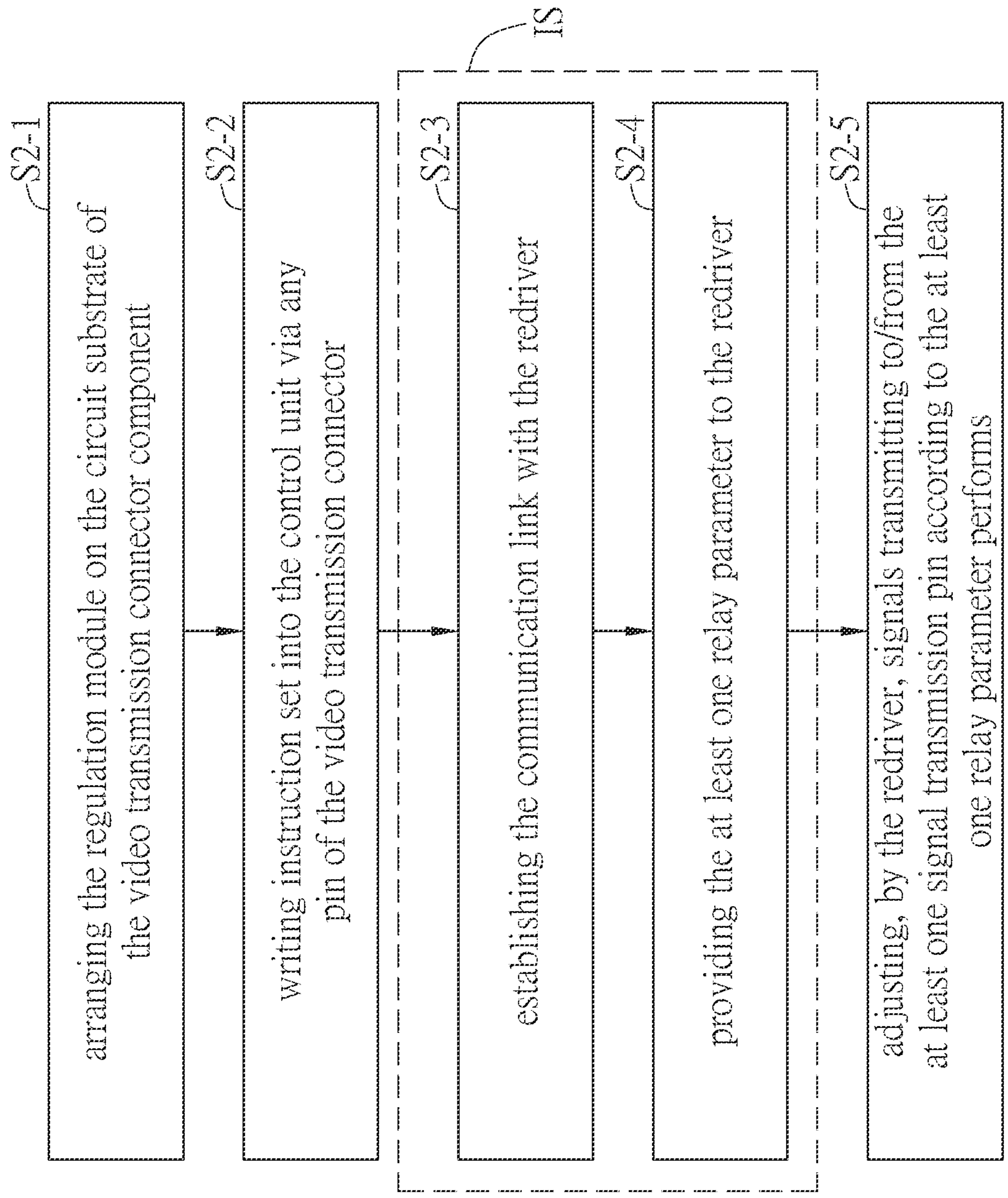

The control unit may be configured to store instruction sets by writing, via the video transmission connector component, the instruction sets into the memory of the control unit or coupled with the control unit. More specifically, refer to FIG. 6, after arranging the regulation module on the circuit substrate of the video transmission connector component (step S2-1), the regulation method may further include: writing instruction set into the control unit via any pin of the video transmission connector (step S2-2). The instruction set executable by the control unit to: establish the communication link with the redriver (steps S2-3); and provide at least one relay parameter to the redriver (steps S2-4). After receiving at least one relay parameter, the redriver will adjust signals transmitting to/from at least one signal transmission pin according to the at least one relay parameter performs (step S2-5).

For instance, the writing pin of the control unit and any pin (preferably a low-frequency pin) of the video transmission connector can be coupled by conducting wires on the circuit substrate of the video transmission connector. The instruction set can be written via the pin of the video transmission connector coupled to the writing pin of the control unit. The writing process can be performed by a programmer coupled to the video transmission connector. After the writing process, the manufacturer can choose to truncate or retain the coupling between the pin of the video transmission connector and the writing pin of the control unit. If the manufacturer decides to retain the coupling between the pin of the video transmission connector and the writing pin of the control unit, the instruction set may directly install into the control unit via the pin of the video transmission connector when rewriting the instruction set or testing the instruction set. Accordingly, the implementation will provide the flexibility for writing instructions set into the control unit. On the other hand, if the manufacturer decided to truncate the coupling between the pin of the video transmission connector and the writing pin of the control unit, the coupling between the pin of the video transmission connector and the writing pin can be truncated by, for example, means for switching (e.g. switches or selectors), directly truncating the conducting wire used to connect the pin of the video transmission connector and the writing pin, or removing the components configured to connect the pin of the video transmission connector and the writing pin (e.g. jumpers or resistors). In this way, it is possible to avoid the influence of the control unit during the signal transmission process of the video transmission connector component or to free the pin occupied by the control unit to avoid influencing the transmission quality.

Figure 7:
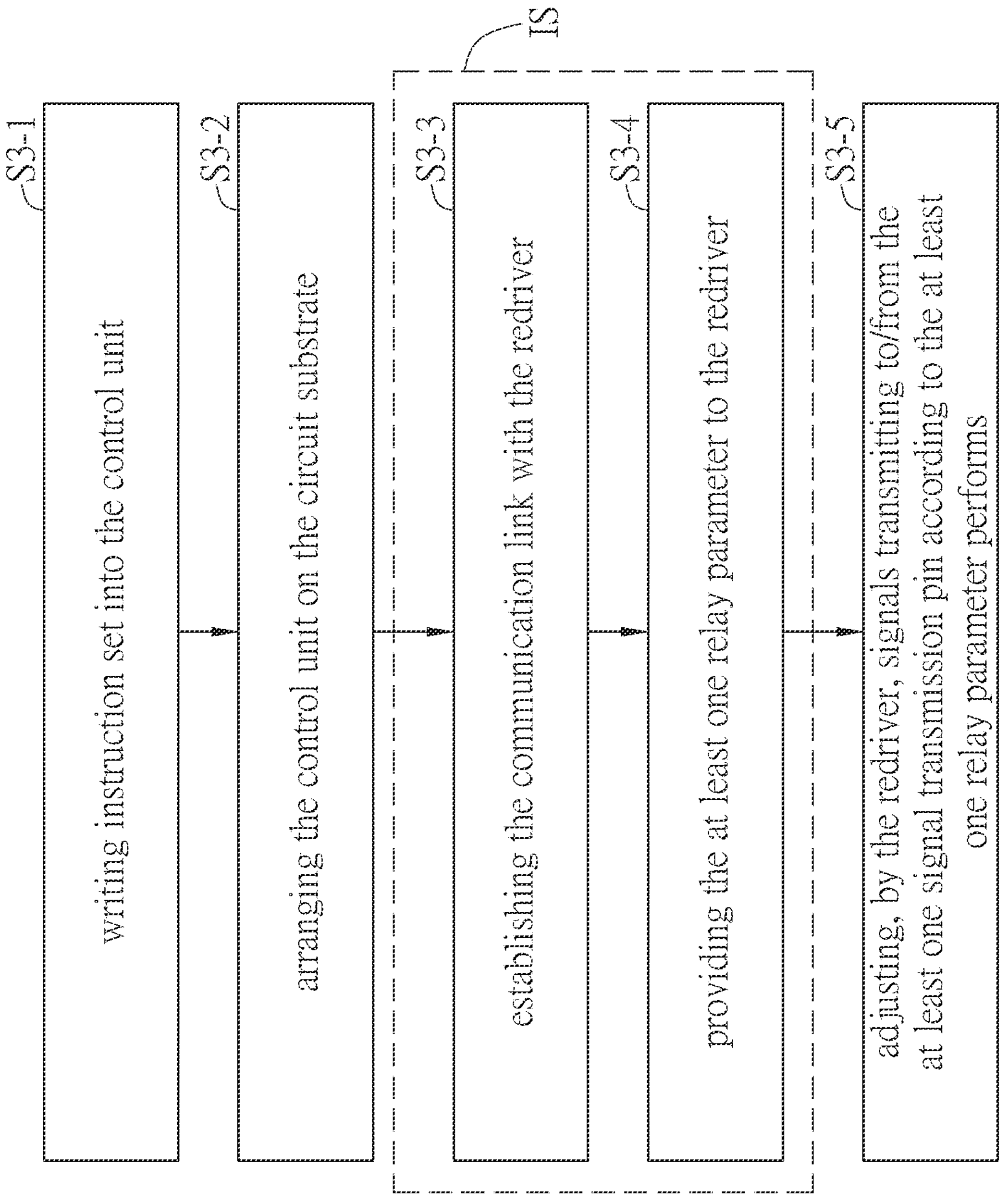

The instruction sets can also be written into the control unit before arranging the control unit on the circuit substrate. Refer to FIG. 7, before arranging the control unit on the circuit substrate (step S3-1), the method further comprises: writing instructions set into the control unit (step S3-2). The instruction set executable by the control unit to: establish the communication link with the redriver (steps S3-3); and provide at least one relay parameter to the redriver (steps S3-4). After receiving at least one relay parameter, the redriver will adjust signals transmitting to/from at least one signal transmission pin according to the at least one relay parameter performs (step S3-5). More specifically, the control unit can be written instruction sets by conventional means for coding a chip. When the regulation module is arranged on the circuit substrate of the video transmission connector, the control unit may directly operate according to the instruction set without any further setting. The writing process may be performed by a conventional means for massive production. Therefore, the implementation will reduce the time for writing instructions set in the control unit.

By the regulation method mentioned above, the relay parameters of the redriver can be adjusted without changing the hardware architecture of the video transmission connector component. The video transmission connector component applied the regulation method will fit transmission cables for different lengths and meet standard specifications instead of changing the video transmission connector component. Therefore, the cost control of materials and/or the time consumption for manufacturing can be optimized.

Fourth Embodiment

Figure 8:
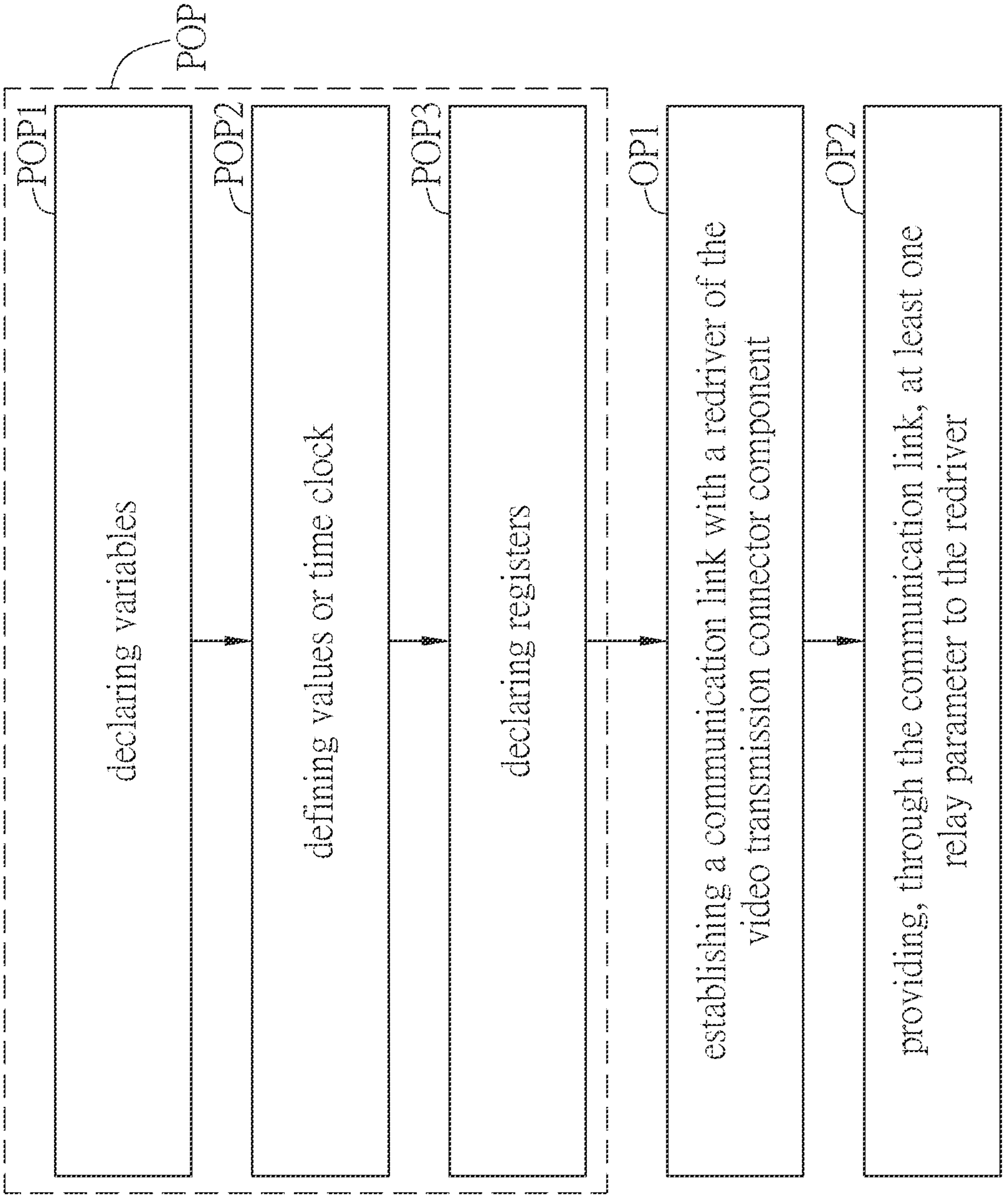
FIG. 8 is a flow chart of operations according to the instruction set of the disclosure.

Refer to FIG. 8, FIG. 8 illustrates the instruction set stored in the control unit of the video transmission connector component. The executable by the control unit is to: establish a communication link with a redriver of the video transmission connector component (OP1); and provide, through the communication link, at least one relay parameter to the redriver (OP2).

More specifically, before accessing the instruction for operation OP1, the instruction set may be executed by the control unit to access the instruction for the operation POP, which is configured to preset or initialize the program to be accessed by the control unit. The operation POP may include declaring variables (POP1), defining values or time clock (POP2), and/or declaring registers (POP3). The operation POP is configured to ensure that the setting and condition for the program/operation, such as establishing the communication link between the control unit and the redriver, to be accessed is stable and ready. It should be noted that the sequence of the above operations (POP1-POP3) can be adjusted, and the operations (POP1-POP3) can be executed or omitted to execute depending on the conventional coding specification. Generally, the instruction set of the presented invention can be modified by people skilled in the coding field to include other instructions, which are configured to perform other necessary or unnecessary operations for establishing the communication link between the control unit and the redriver. The instruction set can be modified according to the protocol of the communication link. For example, if the communication link protocol is the I2C, the instruction set may include instructions for setting start bits, stop bits, response triggers, and other operations related to the I2C protocol. However, the instruction set is not limited to the above operations. In addition, the communication link of the presented invention is not limited to the I2C protocol.

In operation OP2, the instruction set can be correspondingly modified according to the specifications or guidelines of the redriver. For example, the instruction set may be configured to write values, corresponding to different relay parameters, to at least one register of a redriver, which adjusts relay parameters by reading the value of at least one register in the redriver. More specifically, when the east register of the redriver is an 8-bit register, the value to be written into the register may be 0-255 which may correspond to at least 256 relay parameters. In addition, the redriver may have a plurality of registers to regulate relay parameters for a plurality of channels to be redrived. The instruction set can write values into the plurality of registers to regulate the relay parameters for the plurality channels. The plurality of channels can be set with different or identical relay parameters according to the testing results or standard specifications to provide better performance for the redriver.

It should be noted that the presented invention is not limited to the format of instruction sets. For example, the instruction set can be coded with any appropriate programming syntax (such as High-level programming language (e.g. C/C++, java) hardware description language (HDL), or assembly language). The syntax used for the instruction set can be converted, by an assembler, translator, or compiler, to any syntax compatible with the redriver.

The instruction set of the presented invention allows the redriver to have different relay parameters without changing the hardware architecture.

The foregoing disclosure is merely preferred embodiments of the present invention and is not intended to limit the claims of the present invention. Any equivalent technical variation of the description and drawings of the present invention of the present shall be within the scope of the claims of the present invention.

What is claimed is:

1. A video transmission connector component comprising:
- a video transmission connector; and
- a circuit substrate at least including a regulation module;
  - wherein the circuit substrate is coupled with a pin group of the video transmission connector through a first pad set arranged on the circuit substrate;
- wherein the regulation module includes:
  - a control unit; and
  - a redriver configured to couple to at least one signal transmission pin of the pin group of the video transmission connector;
- wherein the control unit is coupled to the redriver and the redriver receives at least one relay parameter which is used to adjust signals transmitting to the at least one signal transmission pin.

2. The video transmission connector component of claim 1, wherein the circuit substrate further comprises:
- a second pad set having at least one signal pad; wherein the signal pad is coupled to the redriver and indirectly coupled to the at least one signal transmission pin through the redriver.

3. The video transmission connector component of claim 1, wherein the control unit is coupled to the redriver via a data line and a clock line.

4. The video transmission connector component of claim 1, wherein the control unit establishes a communication link with the redriver to provide the at least one relay parameter; wherein the communication link is based on a communication protocol of Inter-Integrated Circuit (I2C).

5. The video transmission connector component of claim 1, wherein a writing pin of the control unit is coupled to a pin of the pin group of the video transmission connector.

6. The video transmission connector component of claim 5, wherein the pin is coupled to the writing pin during a process of writing an instruction set into the control unit; when the process of writing the instruction set into the control unit is completed, the pin is not coupled to the writing pin.

7. The video transmission connector component of claim 1, wherein the pin coupled to the writing pin is a low-frequency configuration pin of the pin group.

8. The video transmission connector component of claim 1, wherein the control unit is configured to store an instruction set; the instruction set executable by the control unit to:
- establish a communication link with the redriver; and
- provide the at least one relay parameter to the redriver.

9. The video transmission connector component of claim 8, wherein to provide the at least one relay parameter to the redriver comprises:
- writing a value corresponding to the at least one relay parameter to a register of the redriver.

10. The video transmission connector component of claim 1, wherein the circuit substrate further includes:

a power module at least coupled to a power pin of the pin group and configured to provide power for operating the regulation module.

11. The video transmission connector component of claim 1, wherein the specification of the video transmission connector is selected from one of High Definition Multimedia Interface (HDMI) and DisplayPort (DP).

12. The video transmission connector component of claim 1, wherein the video transmission connector has a setting structure that limits the setting direction of the video transmission connector.

13. A transmission line system comprising:

a transmission cable; and a video transmission connector component arranged on at least one side of the transmission cable, the video transmission connector component comprising:

a video transmission connector; and a circuit substrate at least including a regulation module; wherein the circuit substrate is coupled with a pin group of the video transmission connector through a first pad set arranged on the circuit substrate;

wherein the regulation module includes:

a control unit; and a redriver configured to couple to at least one signal transmission pin of the pin group of the video transmission connector;

wherein the control unit is coupled to the redriver and the redriver receives at least one relay parameter which is used to adjust signals transmitting to the at least one signal transmission pin.

14. A regulation method for a video transmission connector component, the regulation method comprising:

arranging a regulation module on a circuit substrate of the video transmission connector component, wherein the regulation module includes a control unit and a redriver;

establishing a communication link between the control unit and the redriver; providing, by the control unit via the communication link, a at least one relay parameter to the redriver; and adjusting, by the redriver, signals transmitting to the at least one signal transmission pin according to the at least one relay parameter.

15. The regulation method of claim 14, wherein the communication link is based on a communication protocol of Inter-Integrated Circuit (I2C).

16. The regulation method of claim 14, further comprising:

writing, by a pin of the video transmission connector, an instruction set to the control unit, the instruction set executable by the control unit to:

establish the communication link with the redriver; and provide the at least one relay parameter to the redriver.

17. The regulation method of claim 16, further comprising:

when a process of writing the instruction set into the control unit is completed, disconnecting the pin with the writing pin.

18. The regulation method of claim 16, wherein the pin coupled to the writing pin is a low-frequency configuration pin of the pin group.

19. The regulation method of claim 16, further comprising:

coupling a programmer to the pin of the video transmission connector, the programmer is configured to write, through the video transmission connector, the instruction set to the control unit.

20. The regulation method of claim 14, further comprising:

before arranging the regulation module on the circuit substrate of the video transmission connector component, writing an instruction set into the control unit, and the instruction set executable by the control unit to:

establish the communication link with the redriver; and provide the at least one relay parameter to the redriver.

21. The regulation method of claim 14, wherein providing the at least one relay parameter to the redriver comprises:

writing a value corresponding to the at least one relay parameter to a register of the redriver.

22. An instruction set stored in a control unit of a video transmission connector component, the instruction set executable by the control unit to:

establish a communication link with a redriver of the video transmission connector component; and provide, through the communication link, at least one relay parameter to the redriver.

23. The instruction set of claim 22, wherein providing the at least one relay parameter to the redriver comprises:

writing a value corresponding to the at least one relay parameter to a register of the redriver.

* * * * *